(12) United States Patent
Chen et al.

(10) Patent No.: US 9,755,687 B2
(45) Date of Patent: Sep. 5, 2017

(54) HOUSING MOUNTING MECHANISM FOR PORTABLE ELECTRONIC DEVICE

(71) Applicant: KING SLIDE TECHNOLOGY CO., LTD., Kaohsiung (TW)

(72) Inventors: Ken-Ching Chen, Kaohsiung (TW); Wei-Bin Hong, Kaohsiung (TW); Shu-Chen Lin, Kaohsiung (TW)

(73) Assignee: King Slide Technology Co., Ltd., Kaohsiung (TW)

( * ) Notice: Subject to any disclaimer, the term of this patent is extended or adjusted under 35 U.S.C. 154(b) by 0 days.

(21) Appl. No.: 15/200,378

(22) Filed: Jul. 1, 2016

(65) Prior Publication Data

US 2017/0063422 A1    Mar. 2, 2017

(30) Foreign Application Priority Data

Aug. 31, 2015  (TW) .............................. 104128889 A

(51) Int. Cl.
| | |
|---|---|
| H04M 1/00 | (2006.01) |
| H04B 1/3888 | (2015.01) |
| G06F 1/16 | (2006.01) |
| H04M 1/02 | (2006.01) |
| A45C 11/00 | (2006.01) |
| H04B 1/38 | (2015.01) |

(52) U.S. Cl.
CPC ............ *H04B 1/3888* (2013.01); *A45C 11/00* (2013.01); *G06F 1/1613* (2013.01); *H04M 1/0249* (2013.01); *A45C 2011/002* (2013.01)

(58) Field of Classification Search
CPC .. H04M 1/0247; H04M 1/0252; G06F 1/1675
USPC ....................................................... 455/575.1
See application file for complete search history.

(56) References Cited

U.S. PATENT DOCUMENTS

| | | | |
|---|---|---|---|
| 7,916,477 B2 * | 3/2011 | Shen ................... | H04M 1/0262 361/679.58 |
| 8,801,050 B2 | 8/2014 | Chen et al. | |
| 8,937,808 B2 * | 1/2015 | Tu ....................... | H01M 2/0404 361/679.3 |
| 9,072,163 B2 | 6/2015 | Li et al. | |

* cited by examiner

*Primary Examiner* — Lee Nguyen
(74) *Attorney, Agent, or Firm* — Rosenberg, Klein & Lee

(57) ABSTRACT

A housing mounting mechanism for a portable electronic device includes a body, a housing, a mounting member, and a latching member. The housing is detachably mounted to the body. The mounting member is connected to the housing and has at least one mounting portion. The latching member is movably mounted to the body and has at least one latching portion. The at least one latching portion can lock the at least one mounting portion of the mounting member when the latching member is at a first position relative to the body. The at least one mounting portion of the mounting member can disengage from the at least one latching portion after the latching member is displaced to a second position from the first position.

13 Claims, 8 Drawing Sheets

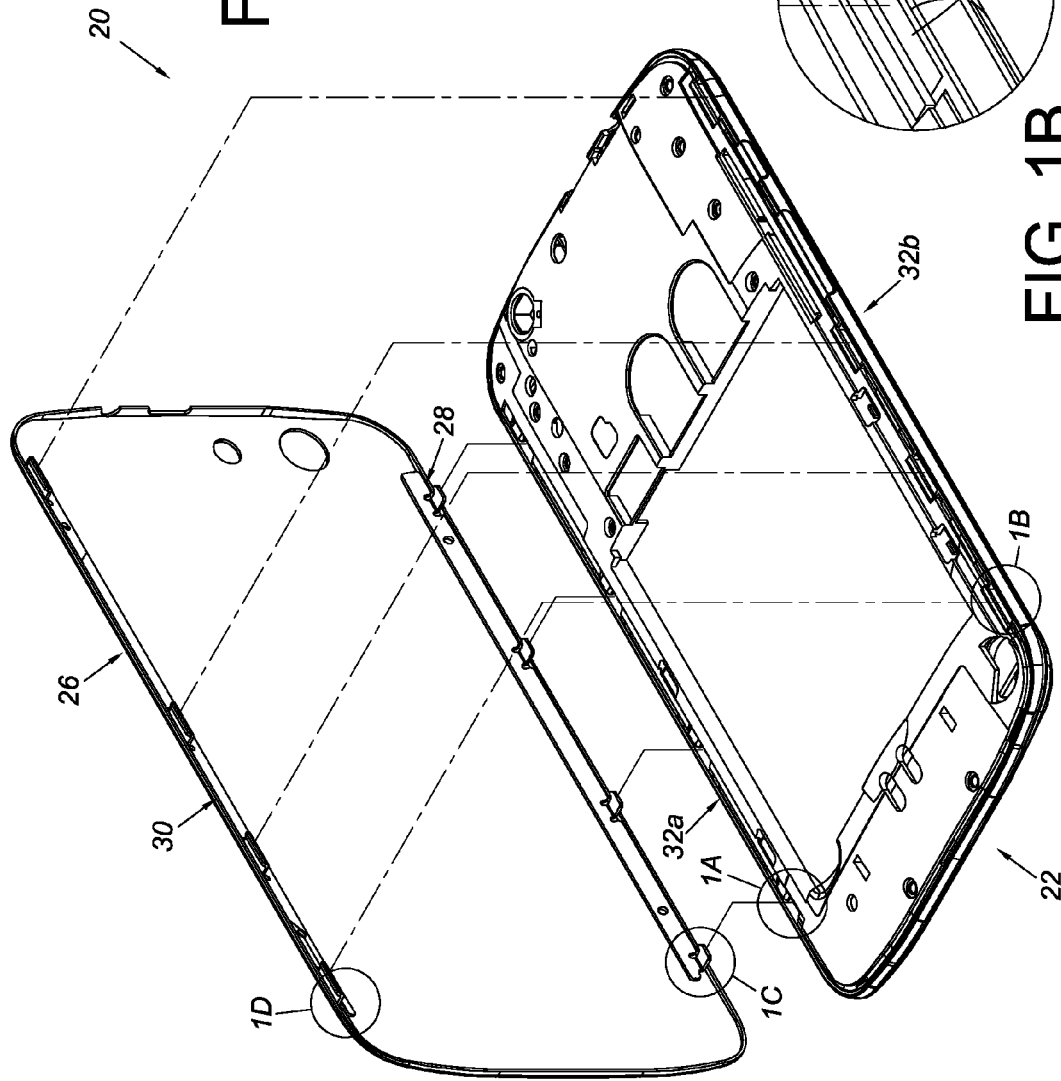
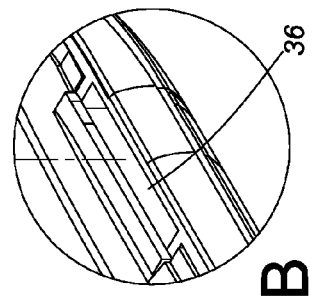
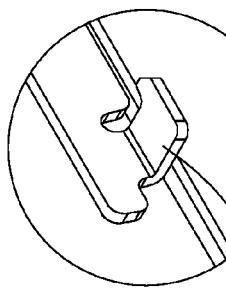
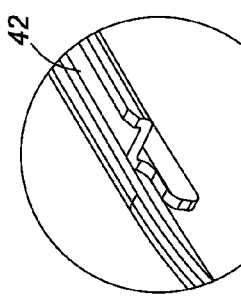

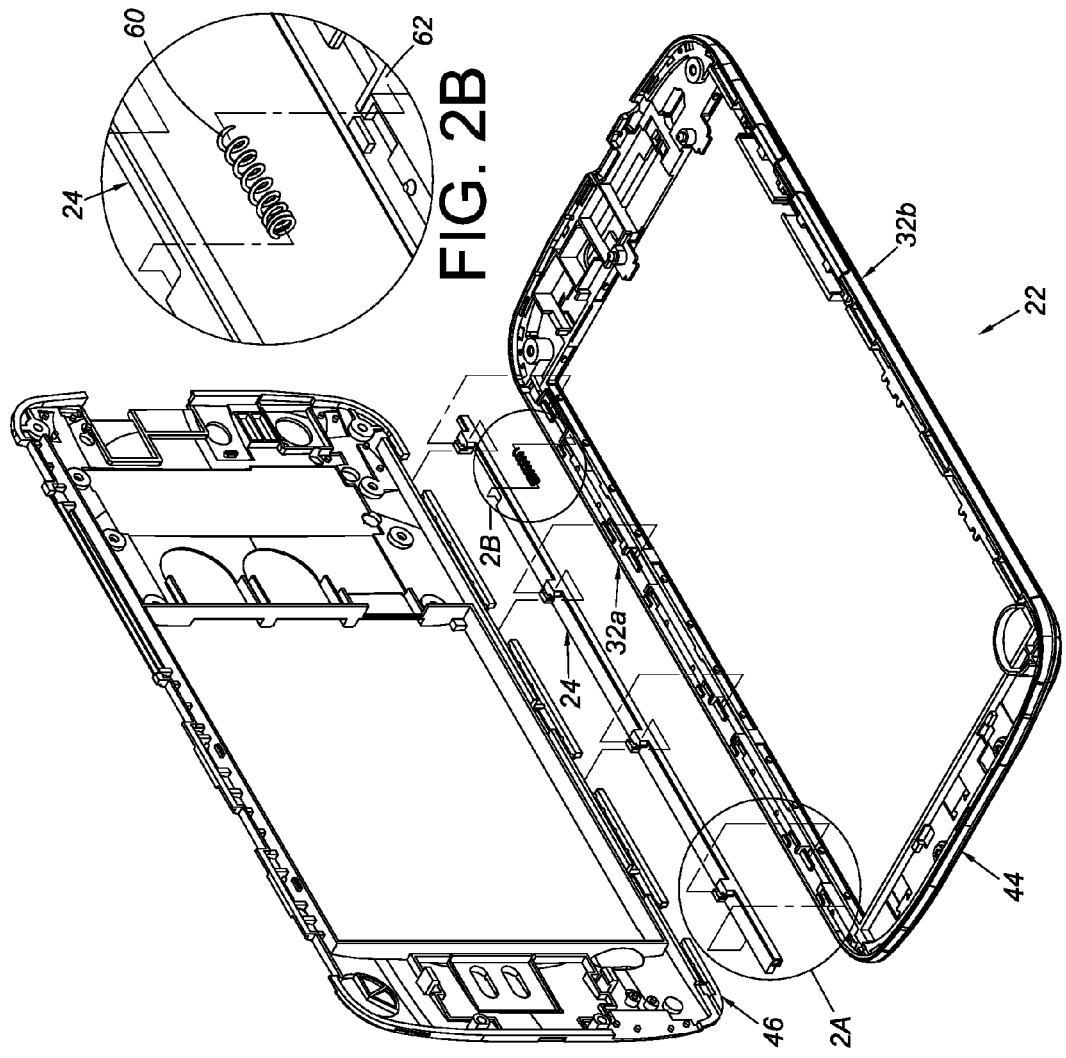

HOUSING MOUNTING MECHANISM FOR PORTABLE ELECTRONIC DEVICE

FIELD OF THE INVENTION

The present invention relates to a mounting mechanism and more particularly to a housing mounting mechanism for a portable electronic device.

BACKGROUND OF THE INVENTION

With the advancement of technology, portable electronic devices have become indispensable to our daily lives. Some portable electronic devices, such as mobile phones, substantially include at least one housing, which is detachable to enable battery or SIM card replacement. For example, U.S. Pat. No. 9,072,163 B2 discloses a housing assembly for a portable electronic device, wherein a housing can be easily mounted to and detached from a body of the portable electronic device.

SUMMARY OF THE INVENTION

The present invention relates to a housing mounting mechanism for a portable electronic device.

According to one aspect of the present invention, a housing mounting mechanism for a portable electronic device includes a body, a housing, a first mounting member, and a latching member. The housing is detachably mounted to the body. The first mounting member is connected to the housing and has at least one first mounting portion. The latching member is movably mounted to the body and has at least one latching portion. The at least one latching portion can lock the at least one first mounting portion of the first mounting member when the latching member is at a first position with respect to the body. The at least one first mounting portion of the first mounting member can disengage from the at least one latching portion when the latching member is displaced to a second position from the first position.

Preferably, the housing mounting mechanism further includes an elastic member mounted between the latching member and the body so that the latching member can remain at the first position in response to an elastic force of the elastic member. In addition, the body has at least one fastening portion, and the housing mounting mechanism includes a second mounting member connected to the housing and having at least one second mounting portion for abutting against the at least one fastening portion.

Preferably, the at least one second mounting portion has a first section and a second section. The second section is bent from the first section and corresponds to the at least one fastening portion of the body. Moreover, the latching member and the at least one fastening portion are adjacent to two corresponding laterals of the body respectively.

Preferably, the body has a release hole corresponding to the latching member.

Preferably, the at least one first mounting portion of the first mounting member has a mounting section, and the at least one latching portion of the latching member has a latching section for locking the mounting section. The latching section and the mounting section each have a respective contact surface including an inclined or horizontal surface.

Preferably, the body has at least one extending section, and the latching member has at least one auxiliary portion. The at least one auxiliary portion and the at least one latching portion jointly define a mounting opening therebetween. The at least one extending section can be mounted in the mounting opening.

Preferably, the at least one latching portion of the latching member has a first guiding surface for guiding the at least one first mounting portion of the first mounting member, and the at least one first mounting portion of the first mounting member has a second guiding surface which can be displaced along the first guiding surface of the latching member.

According to another aspect of the present invention, a housing mounting mechanism for a portable electronic device includes a body, an elastic member, a latching member, a housing, and a mounting member. The latching member is movably mounted to the body and includes at least one latching portion. The at least one latching portion has a guiding surface. The housing can be mounted to the body. The mounting member is connected to the housing and has at least one mounting portion. In the course in which the housing is mounted to the body, the at least one mounting portion of the mounting member pushes the latching member via the guiding surface of the at least one latching portion, thereby displacing the latching member from a first position to a second position. The latching member can displace from the second position to the first position in response to an elastic force of the elastic member, in order for the at least one latching portion of the latching member to lock the at least one mounting portion of the mounting member.

Preferably, the guiding surface of the latching member is an inclined surface.

BRIEF DESCRIPTION OF THE DRAWINGS

FIG. 1 is an exploded perspective view of the housing mounting mechanism for a portable electronic device in the first embodiment of the present invention;

FIG. 1A is an enlarged view of the circled area 1A in FIG. 1, showing that the latching member has at least one latching portion adjacent to the at least one first mounting space;

FIG. 1B is an enlarged view of the circled area 1B in FIG. 1, showing that the second lateral has at least one second mounting space;

FIG. 1C is an enlarged view of the circled area 1C in FIG. 1, showing the at least one first mounting portion of the first mounting member;

FIG. 1D is an enlarged view of the circled area 1D in FIG. 1, showing the at least one second mounting portion of the second mounting member;

FIG. 2 is an exploded view of the body and the latching member in the first embodiment of the present invention;

FIG. 2A is an enlarged view of the circled area 2A in FIG. 2, showing that the latching member is movably mounted in a space between two wall portions of the first portion of the body, and that the at least one extending section can be mounted in a mounting opening between the at least one auxiliary portion and the at least one latching portion of the latching member;

FIG. 2B is an enlarged view of the circled area 2B in FIG. 2, showing the elastic member mounted between the latching member and a wall of the first portion of the body;

DETAILED DESCRIPTION OF THE INVENTION

Figure 3:
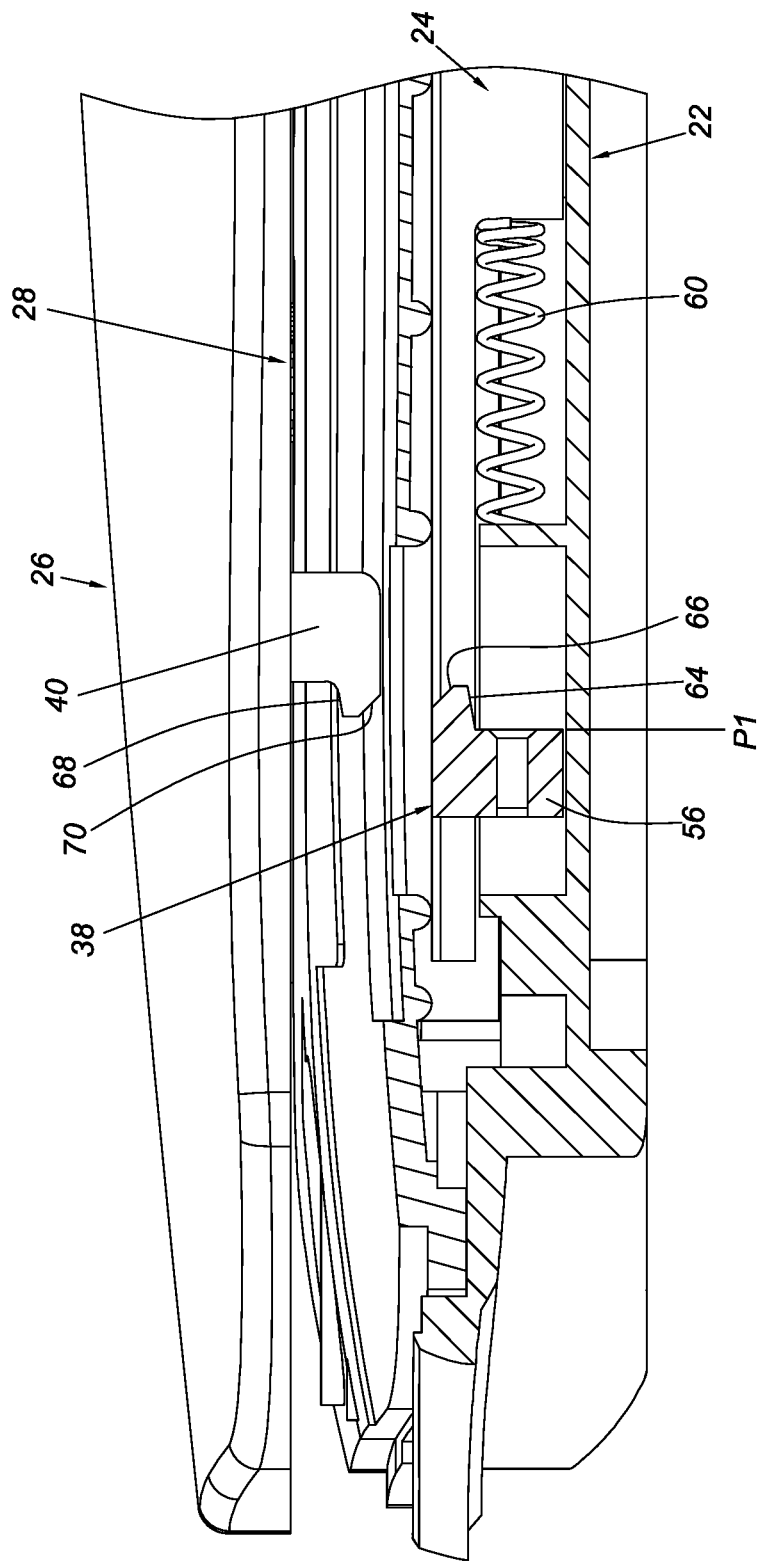
FIG. 3 shows how the housing in the first embodiment of the present invention is moved toward the body in order to be mounted thereto.

Referring to FIGS. 1 to 1D, the housing mounting mechanism 20 for a portable electronic device according to an embodiment of the present invention includes a body 22, a latching member 24, a housing 26, and a first mounting member 28. Preferably, a second mounting member 30 is also included. The body 22 includes a plurality of lateral portions, such as a first lateral 32a and a second lateral 32b corresponding in position to the first lateral 32a. The first lateral 32a has at least one first mounting space 34, and the second lateral 32b has at least one second mounting space 36. The latching member 24 is movably mounted to the body 22 and is adjacent to the first lateral 32a of the body 22. The latching member 24 has at least one latching portion 38 adjacent to the at least one first mounting space 34. The housing 26 is detachably mounted to the body 22. The first mounting member 28 and the second mounting member 30 are connected to two corresponding laterals of the housing 26 respectively. The first mounting member 28 has at least one first mounting portion 40 corresponding to the at least one latching portion 38 of the latching member 24. The second mounting member 30 has at least one second mounting portion 42 corresponding to the at least one second mounting space 36 of the second lateral 32b of the body 22.

As shown in FIGS. 2 to 2B, the body 22 includes a first portion 44 and a second portion 46 opposite the first portion 44. The first portion 44 can be a front portion of the body 22 while the second portion 46 can be a rear portion of the body 22. At least one extending section 48 is provided adjacent to the first lateral 32a of the first portion 44. The latching member 24 is movably mounted in a space 54 between two wall portions 50 and 52 of the first portion 44 of the body 22. Preferably, the latching member 24 further has at least one auxiliary portion 56 configured to work in conjunction with the at least one latching portion 38, and the at least one auxiliary portion 56 and the at least one latching portion 38 jointly define a mounting opening 58 therebetween. The at least one extending section 48 can be mounted in the mounting opening 58. Also included is an elastic member 60 mounted between the latching member 24 and a wall 62 of the first portion 44 of the body 22.

As shown in FIG. 3, the at least one latching portion 38 of the latching member 24 has a latching section 64 and a first guiding surface 66 adjacent to the latching section 64. On the other hand, the at least one first mounting portion 40 of the first mounting member 28 has a mounting section 68 and a second guiding surface 70 adjacent to the mounting section 68. The latching member 24 can stay at a first position P1 with respect to the body 22 in response to the elastic force of the elastic member 60. To mount the housing 26 to the body 22, the operator moves the housing 26 toward the body 22.

Figure 4:
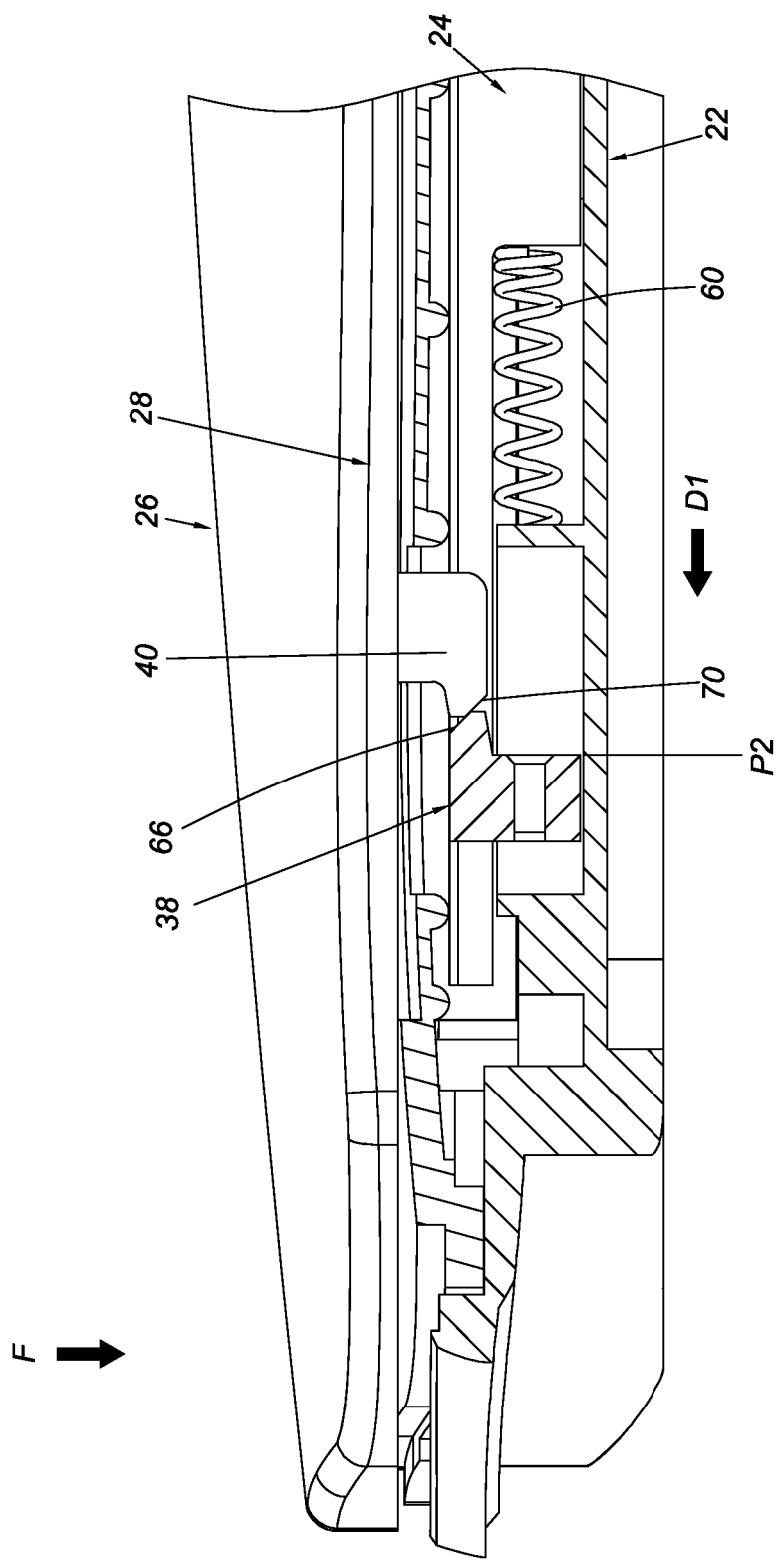
FIG. 4 shows the housing in FIG. 3 in contact with the body.

As shown in FIG. 4, a force F is applied to the housing 26 such that the housing 26 is brought into contact with the body 22. During the process, the second guiding surface 70 of the at least one first mounting portion 40 of the first mounting member 28 corresponds to the first guiding surface 66 of the at least one latching portion 38 of the latching member 24. The first guiding surface 66 guides the at least one first mounting portion 40 of the first mounting member 28 in order for the housing 26 to displace along the first guiding surface 66 of the latching member 24 to a mounting position on the body 22. Preferably, at least one of the first guiding surface 66 and the second guiding surface 70 is an inclined surface. During the mounting process, the at least one first mounting portion 40 of the first mounting member 28 is pressed against the at least one latching portion 38 of the latching member 24 such that the latching member 24 is displaced from the first position P1 to a second position P2 with respect to the body 22 in a first direction D1. Meanwhile, the elastic member 60 generates an elastic force in response to the displacement of the latching member 24.

Figure 5:
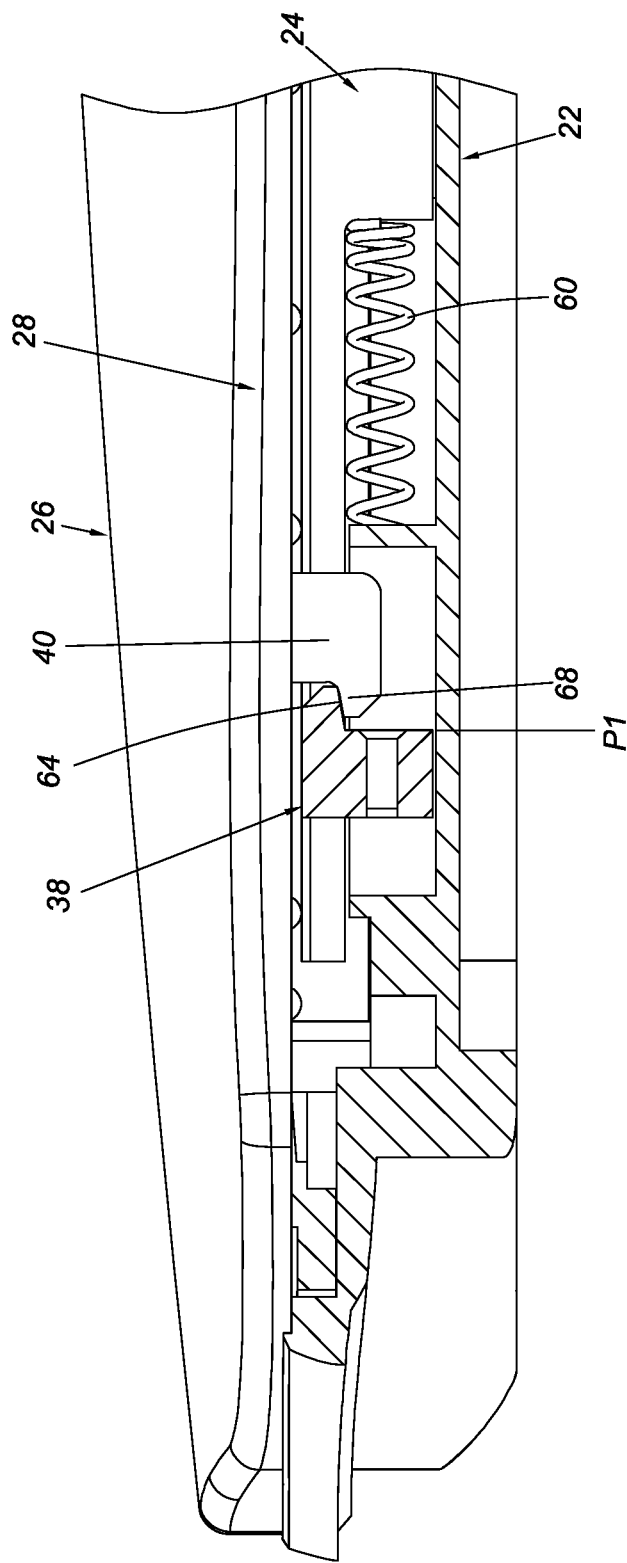
FIG. 5 shows the housing in FIG. 4 mounted and positioned on the body.

Once the housing 26 is displaced to the mounting position on the body 22, referring to FIG. 5, the latching member 24 is brought back to the first position P1 by the elastic force released by the elastic member 60, allowing the latching section 64 of the at least one latching portion 38 to lock the mounting section 68 of the at least one first mounting portion 40 of the first mounting member 28. In one embodiment, the respective contact surfaces of the latching section 64 and the mounting section 68 (i.e., the surfaces respectively with which the latching section 64 and the mounting section 68 contact each other) are inclined surfaces.

Figure 6:
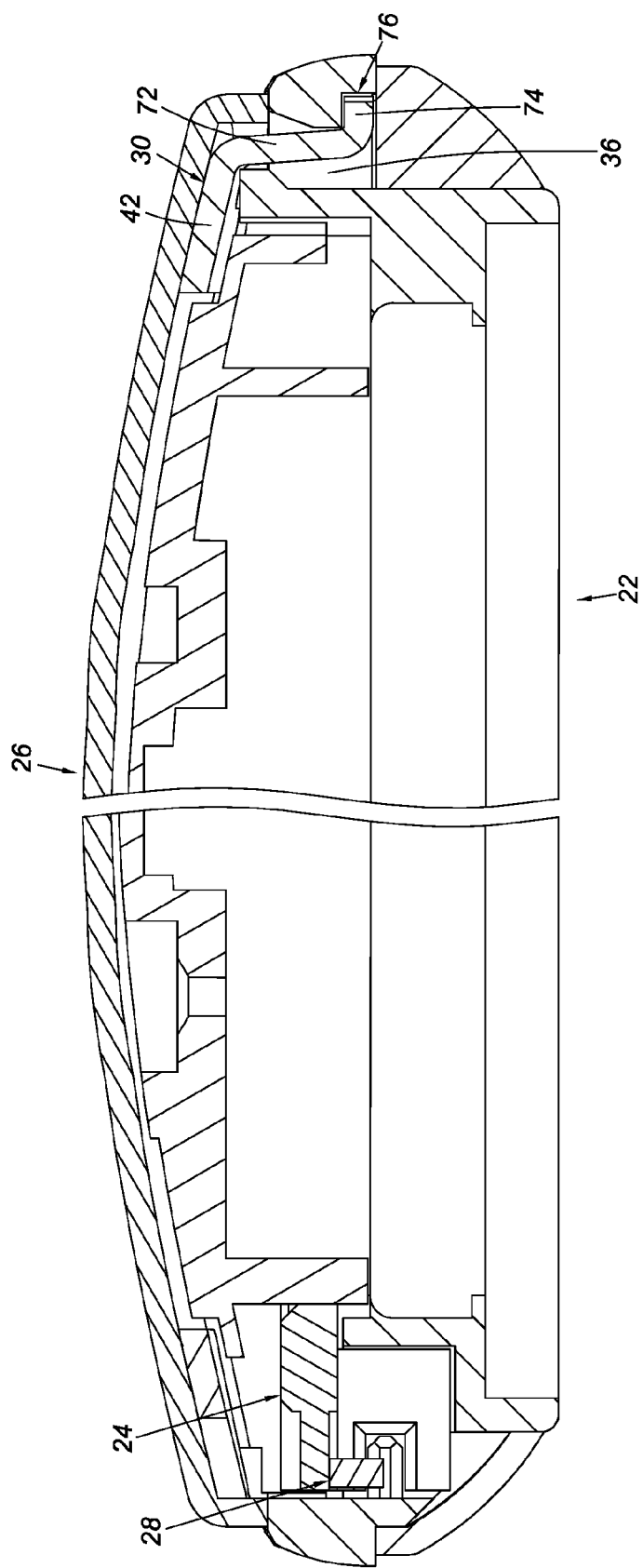
FIG. 6 is a sectional view of the housing mounting mechanism for a portable electronic device in the first embodiment of the present invention.

FIG. 6 shows the housing 26 mounted on the body 22. More specifically, the latching member 24 locks the first mounting member 28 in place. Preferably, the at least one second mounting portion 42 of the second mounting member 30 has a first section 72 and a second section 74 bent from the first section 72. The first section 72 is received in the at least one second mounting space 36 and the second section 74 is pressed against at least one fastening portion 76 (e.g., a recessed structure) of the body 22.

Figure 7:
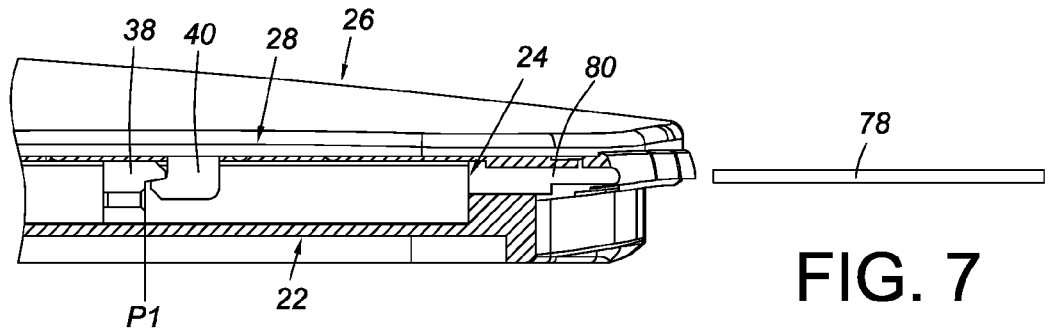
FIG. 7 shows that the housing mounting mechanism in the first embodiment of the present invention has a release hole into which a tool can be inserted.
Figure 8:
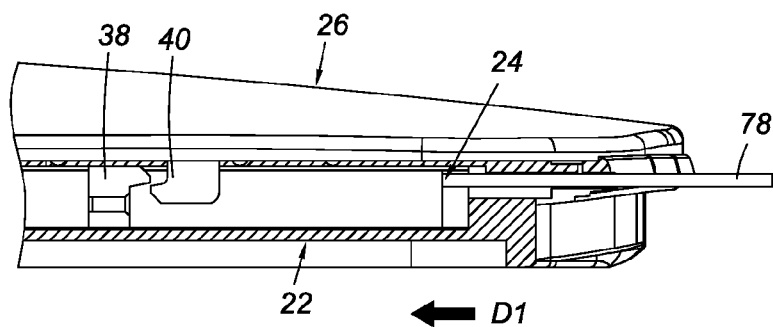
FIG. 8 shows the tool in FIG. 7 inserted into the release hole to push and thereby displace the latching member.
Figure 9:
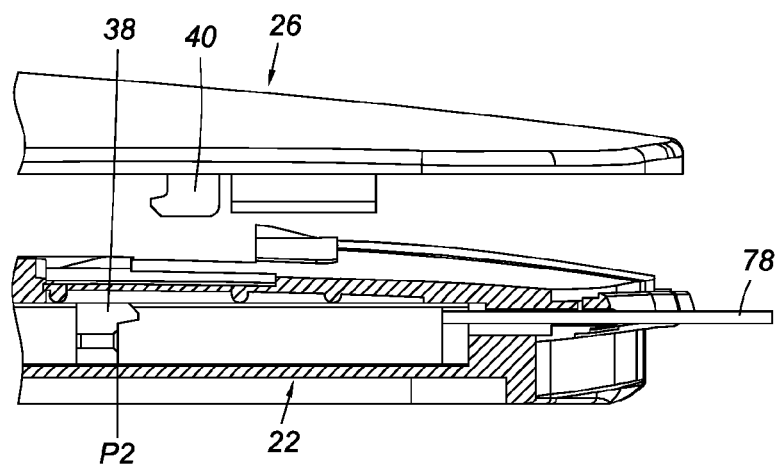
FIG. 9 shows the housing in FIG. 8 detached from the body after the latching member is pushed and displaced by the tool.

When it is desired to detach the housing 26 from the body 22, referring to FIG. 7 to FIG. 9, the operator inserts a tool 78 into a release hole 80 of the body 22 and thereby applies a pushing force to the latching member 24. Consequently, the latching member 24 is displaced from the first position P1 to the second position P2 in a direction D1 to separate the at least one first mounting portion 40 of the first mounting member 28 from the at least one latching portion 38 of the latching member 24. The operator can then detach the housing 26 from the body 22 to, for example, change a battery or SIM card of the portable electronic device.

Figure 10:
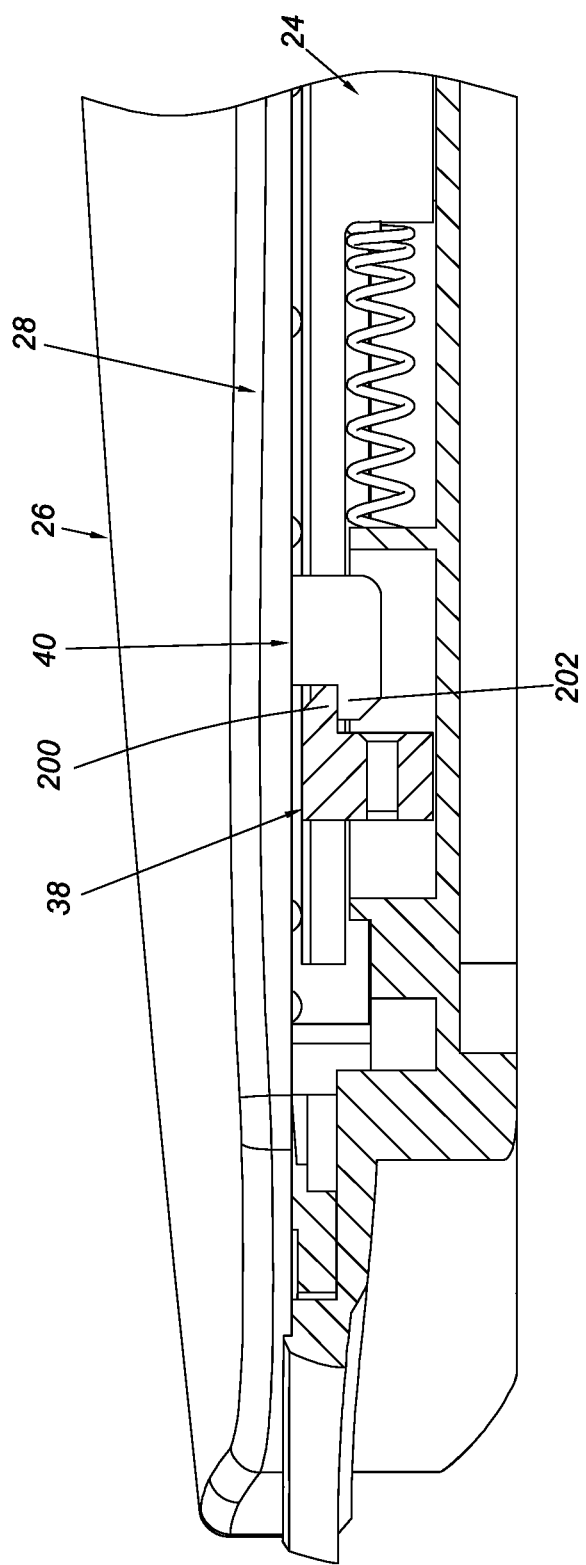
FIG. 10 shows the housing in the second embodiment of the present invention mounted and positioned on the body.

In the second embodiment of the present invention as shown in FIG. 10, the contact surface of the latching section 200 of the at least one latching portion 38 of the latching member 24 is a horizontal surface, and the contact surface of the mounting section 202 of the at least one first mounting portion 40 of the first mounting member 28 is also a horizontal surface. The at least one latching portion 38 in this embodiment is equally capable of locking the at least one first mounting portion 40.

The present invention has been disclosed by way of the foregoing preferred embodiments, which, however, are not intended to be restrictive of the invention. The scope of patent protection sought by the applicant is defined by the appended claims.

What is claimed is:

1. A housing mounting mechanism for a portable electronic device, comprising:
   a body;
   a housing detachably mounted to the body;
   a first mounting member connected to the housing, the first mounting member having at least one first mounting portion;
   a latching member movably mounted to the body, the latching member having at least one latching portion;
   wherein the at least one latching portion releasably locks the at least one first mounting portion of the first mounting member when the latching member is at a first position with respect to the body;
   wherein the at least one first mounting portion of the first mounting member is disengageable from the at least one latching portion when the latching member is displaced to a second position from the first position; and
   at least one extending section formed on the body, the latching member having at least one auxiliary portion, the at least one auxiliary portion and the at least one latching portion jointly defining a mounting opening therebetween, and the at least one extending section being mounted in the mounting opening.

2. The housing mounting mechanism of claim 1, further comprising an elastic member mounted between the latching member and the body in order for the latching member to remain at the first position in response to an elastic force of the elastic member.

3. The housing mounting mechanism of claim 1, wherein the body has a release hole corresponding to the latching member.

4. The housing mounting mechanism of claim 1, wherein the body has at least one fastening portion, the housing mounting mechanism further comprises a second mounting member connected to the housing, and the second mounting member has at least one second mounting portion for abutting against the at least one fastening portion.

5. The housing mounting mechanism of claim 4, wherein the at least one second mounting portion has a first section and a second section bent from the first section, and the second section corresponds to the at least one fastening portion of the body.

6. The housing mounting mechanism of claim 4, wherein the latching member and the at least one fastening portion are adjacent to two corresponding laterals of the body respectively.

7. The housing mounting mechanism of claim 1, wherein the at least one first mounting portion of the first mounting member has a mounting section, and the at least one latching portion of the latching member has a latching section for locking the mounting section.

8. The housing mounting mechanism of claim 7, wherein the latching section and the mounting section each have a respective contact surface including an inclined surface.

9. The housing mounting mechanism of claim 7, wherein the latching section and the mounting section each have a respective contact surface including a horizontal surface.

10. The housing mounting mechanism of claim 1, wherein the at least one latching portion of the latching member has a first guiding surface for guiding the at least one first mounting portion of the first mounting member.

11. The housing mounting mechanism of claim 10, wherein the at least one first mounting portion of the first mounting member has a second guiding surface displaceable along the first guiding surface of the latching member.

12. A housing mounting mechanism for a portable electronic device, comprising:
    a body;
    an elastic member;
    a latching member movably mounted to the body, the latching member including at least one latching portion, the at least one latching portion having a guiding surface;
    a housing mountable to the body;
    a mounting member connected to the housing, the mounting member having at least one mounting portion;
    wherein while the housing is being mounted to the body, the at least one mounting portion of the mounting member pushes the latching member via the guiding surface of the at least one latching portion and thereby displaces the latching member from a first position to a second position;
    wherein the latching member is displaced from the second position back to the first position responsive to an elastic force of the elastic member to thereby lock the at least one latching portion of the latching member with respect to the at least one mounting portion of the mounting member; and
    at least one extending section formed on the body, the latching member having at least one auxiliary portion, the at least one auxiliary portion and the at least one latching portion jointly defining a mounting opening therebetween, and the at least one extending section being mounted in the mounting opening.

13. The housing mounting mechanism of claim 12, wherein the guiding surface of the latching member is an inclined surface.

* * * * *